(12) United States Patent
Harmer et al.

(10) Patent No.: US 8,583,906 B2
(45) Date of Patent: *Nov. 12, 2013

(54) BIOS FIELD MAPPING

(75) Inventors: Tracy Harmer, Pflugerville, TX (US); Frank Quintanilla, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,108

(22) Filed: Jun. 21, 2012

(65) Prior Publication Data

US 2012/0260077 A1  Oct. 11, 2012

Related U.S. Application Data

(63) Continuation of application No. 12/534,704, filed on Aug. 3, 2009, now Pat. No. 8,219,791.

(51) Int. Cl.
*G06F 15/177* (2006.01)

(52) U.S. Cl.
USPC ................................. 713/1; 713/2; 713/100

(58) Field of Classification Search
None
See application file for complete search history.

(56) References Cited

U.S. PATENT DOCUMENTS

| 7,467,134 | B2 | 12/2008 | Bayiates |
| 7,590,836 | B1 | 9/2009 | Holmberg et al. |
| 2005/0198487 | A1* | 9/2005 | Zimmer et al. ........... 713/2 |
| 2006/0075070 | A1 | 4/2006 | Merissert-Coffinieres et al. |
| 2007/0005734 | A1 | 1/2007 | Abdo |
| 2008/0184025 | A1* | 7/2008 | Dayan et al. ............. 713/2 |

OTHER PUBLICATIONS

Extensible Firmware Interface Specification, Dec. 1, 2002, pp. 1-1084, Version 1.10, Intel Corporation.
Intel® Platform Innovation Framework for EFI Human Interface Infrastructure Specification, Draft Review, Oct. 21, 2005, pp. 1-145, Version 0.92, Intel Corporation.
VFR Programming Language, Intel, Feb. 20, 2008, pp. 1-46, Revision 1.1, Intel Corporation.

\* cited by examiner

*Primary Examiner* — Dennis M Butler
(74) *Attorney, Agent, or Firm* — Haynes and Boone, LLP (57) ABSTRACT

BIOS field mapping includes generating basic input/output system (BIOS) information by defining property identifications using a visual form code language and determining that a proprietary set-up service is accessible. The BIOS field mapping then includes converting the visual form code language to a binary format and storing the property identifications in binary format on a setup database as data hidden from an operating system. A BIOS driver may then request the property identifications causing a transfer of the property identifications to the BIOS driver.

20 Claims, 7 Drawing Sheets

```
// Solution using the HIDDEN statement
/////Floppy Form
form formid = AUTO_ID(NAT_FLOPPY_FORM_ID),
    title = STRING_TOKEN(STR_NAT_FLOPPY_FORM);

SUBTITLE(STRING_TOKEN(STR_NAT_FLOPPY_FORM))
    SEPARATOR oneof varid  = NAT_FDC_NV_DATA.FdcEnable,
        prompt  = STRING_TOKEN(STR_NAT_FLOPPY_PROMPT),
        help    = STRING_TOKEN(STR_NAT_FLOPPY_PROMPT_HELP),
        option text = STRING_TOKEN(STR_DISABLED), value = VALUE_DEACTIVATE, flags = VALUE_ACTIVATE, flags = DEFAULT |
RESET_REQUIRED;
        option text = STRING_TOKEN(STR_ENABLED), value = VALUE_ACTIVATE, flags = DEFAULT |
RESET_REQUIRED;
    endoneof;

hidden value= 0, key= PID_BUILT_IN_FLOP;\      // Property ID declaration
    hidden value= 0, key= 0;\                      // Null GUID declaration
    hidden value= 0, key= 0;\                      // ...
    hidden value= 0, key= 0;\                      // ...
    hidden value= 0, key= 0;                       // ...

endform; //Floppy Form
```

```
// Solution using the HIDDEN statement as a macro
/////Floppy Form
form formid = AUTO_ID(NAT_FLOPPY_FORM_ID),
title = STRING_TOKEN(STR_NAT_FLOPPY_FORM);

SUBTITLE(STRING_TOKEN(STR_NAT_FLOPPY_FORM))
        SEPARATOR oneof varid    = NAT_FDC_NV_DATA.FdcEnable,
            prompt   = STRING_TOKEN(STR_NAT_FLOPPY_PROMPT),
            help     = STRING_TOKEN(STR_NAT_FLOPPY_PROMPT_HELP),
            option text = STRING_TOKEN(STR_DISABLED), value = VALUE_DEACTIVATE, flags =
RESET_REQUIRED;
            option text = STRING_TOKEN(STR_ENABLED), value = VALUE_ACTIVATE, flags = DEFAULT |
RESET_REQUIRED;
        endoneof;

dell_pid(PID_BUILT_IN_FLOP)

endform; //Floppy Form
```

Fig. 5

```
// Solution using SUPPRESSIF statements
//// Floppy Form
    form formid = AUTO_ID(NAT_FLOPPY_FORM_ID),
    title = STRING_TOKEN(STR_NAT_FLOPPY_FORM);

SUBTITLE(STRING_TOKEN(STR_NAT_FLOPPY_FORM))
        SEPARATOR
        oneof varid   = NAT_FDC_NV_DATA.FdcEnable,
            prompt   = STRING_TOKEN(STR_NAT_FLOPPY_PROMPT),
            help     = STRING_TOKEN(STR_NAT_FLOPPY_PROMPT_HELP),
            option text = STRING_TOKEN(STR_DISABLED), value = VALUE_DEACTIVATE, flags =
RESET_REQUIRED;
            option text = STRING_TOKEN(STR_ENABLED), value = VALUE_ACTIVATE, flags = DEFAULT |
RESET_REQUIRED;
        endoneof;

suppressif TRUE        // Always suppress the following from being displayed
            oneof varid = NAT_FDC_NV_DATA.FdcEnable,
                prompt   = STRING_TOKEN(STR_EMPTY),
                help     = STRING_TOKEN(STR_EMPTY),
                option text = STRING_TOKEN(STR_EMPTY), value = 0, flags = 0, key = PID_BUILT_IN_FLOP; //PID
value is encoded in the KEY field.
            endoneof;

endform; // Floppy Form
```

Fig. 6

BIOS FIELD MAPPING

CROSS-REFERENCE TO RELATED APPLICATIONS

This application claims priority to and is a continuation of co-pending U.S. patent application Ser. No. 12/534,704 filed Aug. 3, 2009, incorporated herein by reference in its entirety.

BACKGROUND

The present disclosure relates generally to information handling systems, and more particularly to a basic input/output system (BIOS) field mapping for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Upon startup of an IHS a BIOS generally controls early operations of the IHS (e.g., before an operating system takes control of the IHS). The BIOS is generally expected to provide a BIOS setup system that can be used to configure options for how the system performs and how it is to be configured. Devices can be turned on and off, different configurations can be selected, security of the system can be setup and more. What is known as a Unified Extensible Firmware Interface (UEFI) BIOS is a newer form of BIOS implementation that is comprised of UEFI BIOS drivers.

The BIOS may ensure that the data associated with setup and other UEFI BIOS drivers cannot be changed except in an authorized fashion. This leads to security concerns which become an issue when using a programming language called visual forms representation (VFR) and storing setup data in the system configuration file. The VFR programming language only allows access to data stored through a Variable Services protocol. Thus, the VFR programming language only allows a developer to define a structure and field that can only be accessed through the Variable Services protocol. By default there is no way to specify what data storing protocol to use. As such, the default implementation of how to do this is to use a monolithic system configuration structure to define all of the setup variables. Thus, the setup options are added to a very large data structure. One problem with this is that variable services is a runtime service that exposes its interface to the IHS operating system and other code running on the IHS. This potentially exposes all of the variable services data to any executing code in the operating system and thus, may allow unauthorized access to the data.

Accordingly, it would be desirable to provide an improved BIOS field mapping of data to secure the data.

SUMMARY

According to one embodiment, BIOS field mapping includes generating BIOS information by defining property identifications using a visual form code language and determining that a proprietary set-up service is accessible. The BIOS field mapping then includes converting the visual form code language to a binary format, storing the property identifications in binary format on a setup database as data hidden from an operating system. A BIOS driver may then request the property identifications causing a transfer of the property identifications to the BIOS driver.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
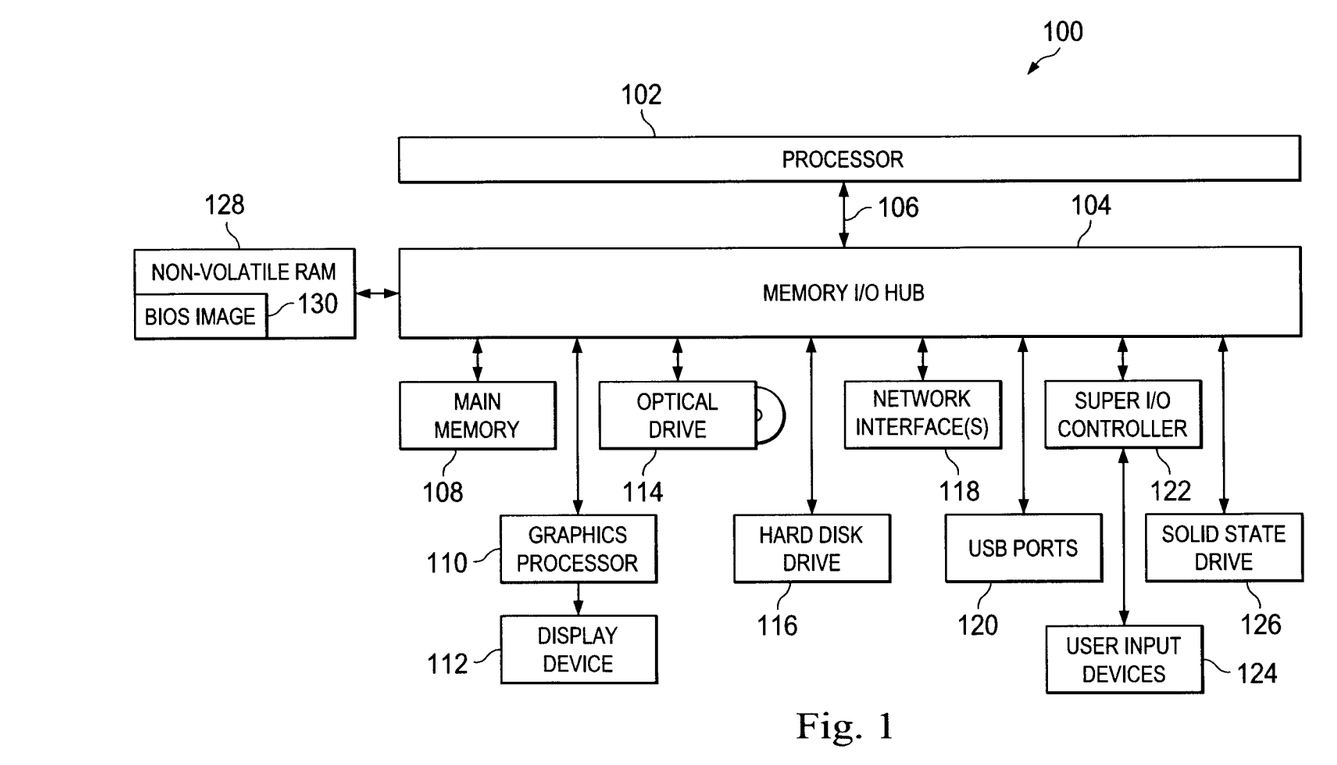
FIG. 1 illustrates a block diagram of an embodiment of an IHS.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. Any or all of the drive devices 114, 116, and 126 may be located locally with the IHS 100, located remotely from the IHS 100, and/or they may be virtual with respect to the IHS 100.

The IHS 100 also includes a non-volatile random access memory (NVRAM) 128. As should be understood, the NVRAM 128 stores and holds data when the IHS 100 and the NVRAM 128 is electrically powered and also when the IHS 100 and the NVRAM 128 is not electrically powered. The data stored in the NVRAM 128 may be used by the processor 102 or other components of the IHS 100. For example, the NVRAM 128 may include a BIOS image 130. The BIOS is a software image 130 that controls operations of the IHS 100 upon start-up and before the operating system takes control of the IHS 100. The BIOS image 130 provides a BIOS setup system that can be used to configure options for how the system performs and how it is to be configured. Using the BIOS image 130, devices can be turned on and off, different configurations can be selected and security of the system can be setup, among other features, as should be understood in the art.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

A type of BIOS, e.g. BIOS image 130, is known as Unified Extensible Firmware Interface (UEFI). The UEFI specification has traditionally defined how a UEFI BIOS operates. In addition, there is a framework for EFI that provides a default set of standard specifications, drivers and interfaces. Part of this framework comes from two specifications that govern how a typical UEFI setup will be developed, how it works internally, how data is stored and how screens are defined. The first specification is the HII specification. HII generally provides access to a database of information related to user interfaces and setup. The type of information that is typically stored in the HII database includes fonts, keyboard mappings, strings and forms. This allows the storage of data groups of each of these types of data and allows access to them. The second specification is the EFI Form Browser specification and protocols. This provides display browser capabilities that allow forms that are stored in the HII database to be interpreted at runtime and displayed to a user of the IHS.

In addition, a programming language and two file types may be used to define specific BIOS setup screens and associated data. The programming language typically used for this is known as visual forms representation (VFR) programming language and the two files are known as a VFR file and an internal forms representation (IFR) file. A VFR compiler reads in the VFR file and produces a binary form of the same data into the IFR file. The IFR file data is what is read into the HII database when the UEFI BIOS, e.g., BIOS image 130, is ran.

With the IFR file data in the HII database, standard UEFI setup browsers can query the HII database for the screen data and other information in order to display and interact with both the user and the IHS 100. The VFR language, complier, and default UEFI browsers may be limiting on traditional systems with respect to the type of functionality and remote configurability that is expected by a Business Client BIOS or other similar system. A Business Client BIOS is not limited to a single consumer of the HII data. In fact, there may be several clients. For example, what is known as a DASH interface standard requires that the setup strings and options be available to it so that information can be sent to a remote console to allow system configuration remotely. In the past, typical solutions to this problem include modifying the setup code to provide access to the setup screen data to duplicate the setup data in two different code locations. In UEFI a user does not have the luxury of modifying how VFR and the standard setup browser work without becoming non-standard. Another example is coordinating setting changes through an SMBIOS interface.

Generally, Business Client UEFI BIOS and SMBIOS drivers access their data through Variable Services and the settings need to be coordinated between setup, SMBIOS, DASH and other drivers. The BIOS image 130 generally needs to share data between different UEFI drivers and functions such as SMBIOS, setup, DASH, etc. The BIOS image 130 also needs to ensure that the data associated with setup and these other drivers cannot be changed except when authorized. Due to the security concerns of using the variable services protocol for system configuration data along with other needed functionality, the PG Client UEFI BIOS effort uses a set of drivers called Property Services to store and retrieve data instead of using Variable Services. This is what the UEFI SMBIOS drivers may use to store and retrieve data associated with the settings that are read and modified through the SMBIOS interface.

In an embodiment, the present disclosure provides a system to map BIOS setup field data to a data storage device using the VFR programming language and for the mapping to be stored in a HII database with other BIOS setup screen definition information. Accordingly, Property Services drivers may be used to store and retrieve various types of volatile and non-volatile BIOS data.

Figure 2A:
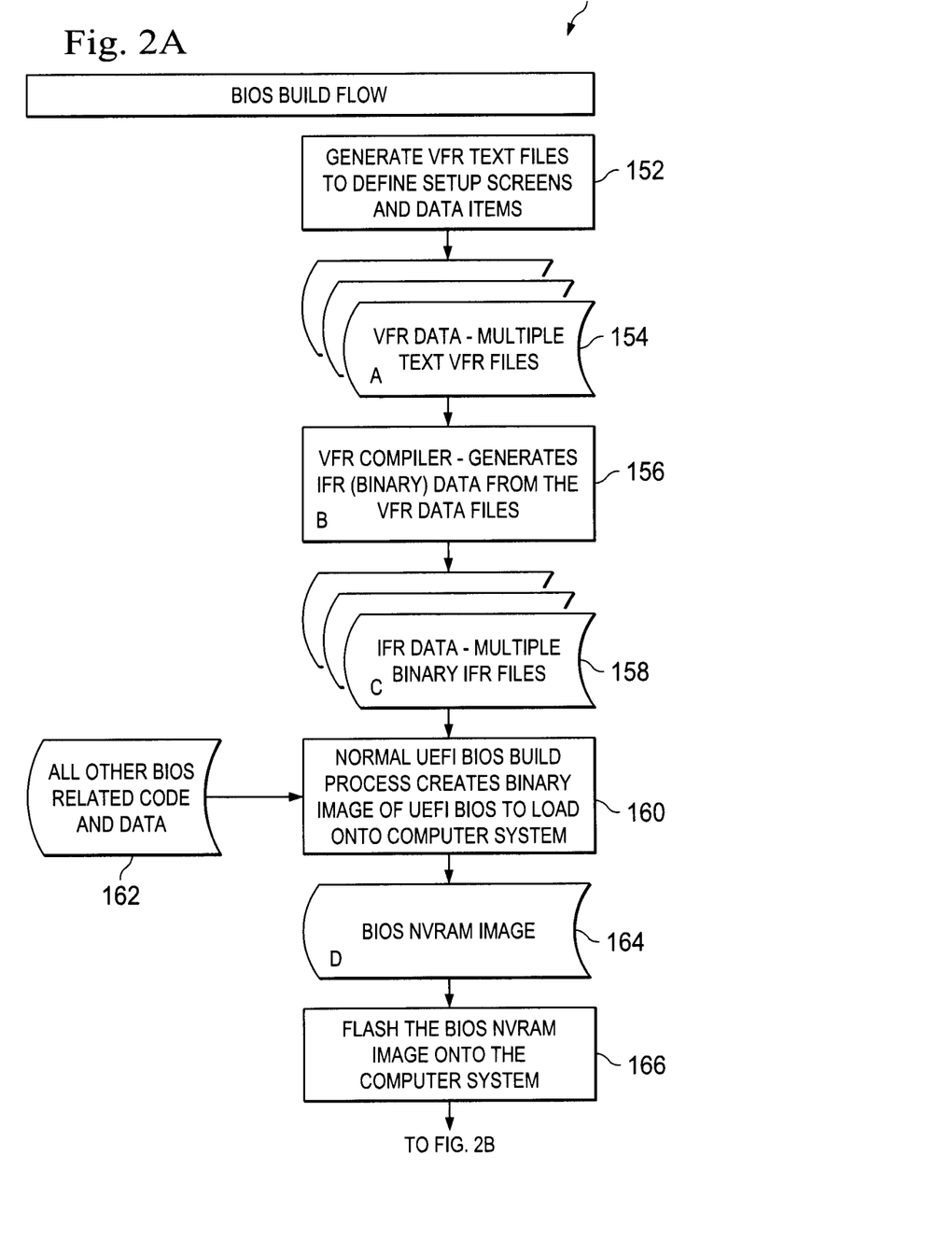
FIGS. 2A and 2B illustrate block diagrams of an embodiment of a BIOS field mapping flow using an IHS.
Figure 2B:
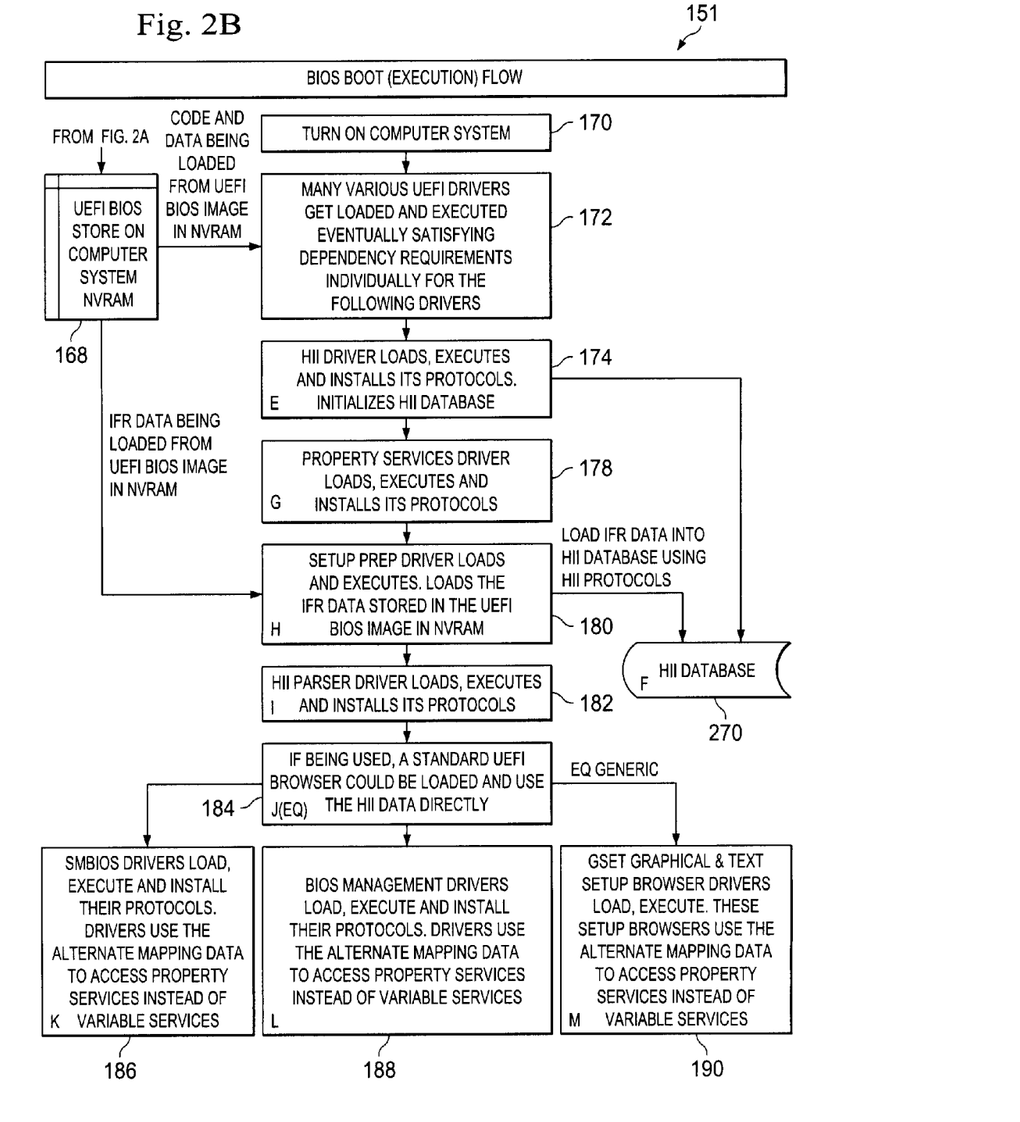
Figure 3:
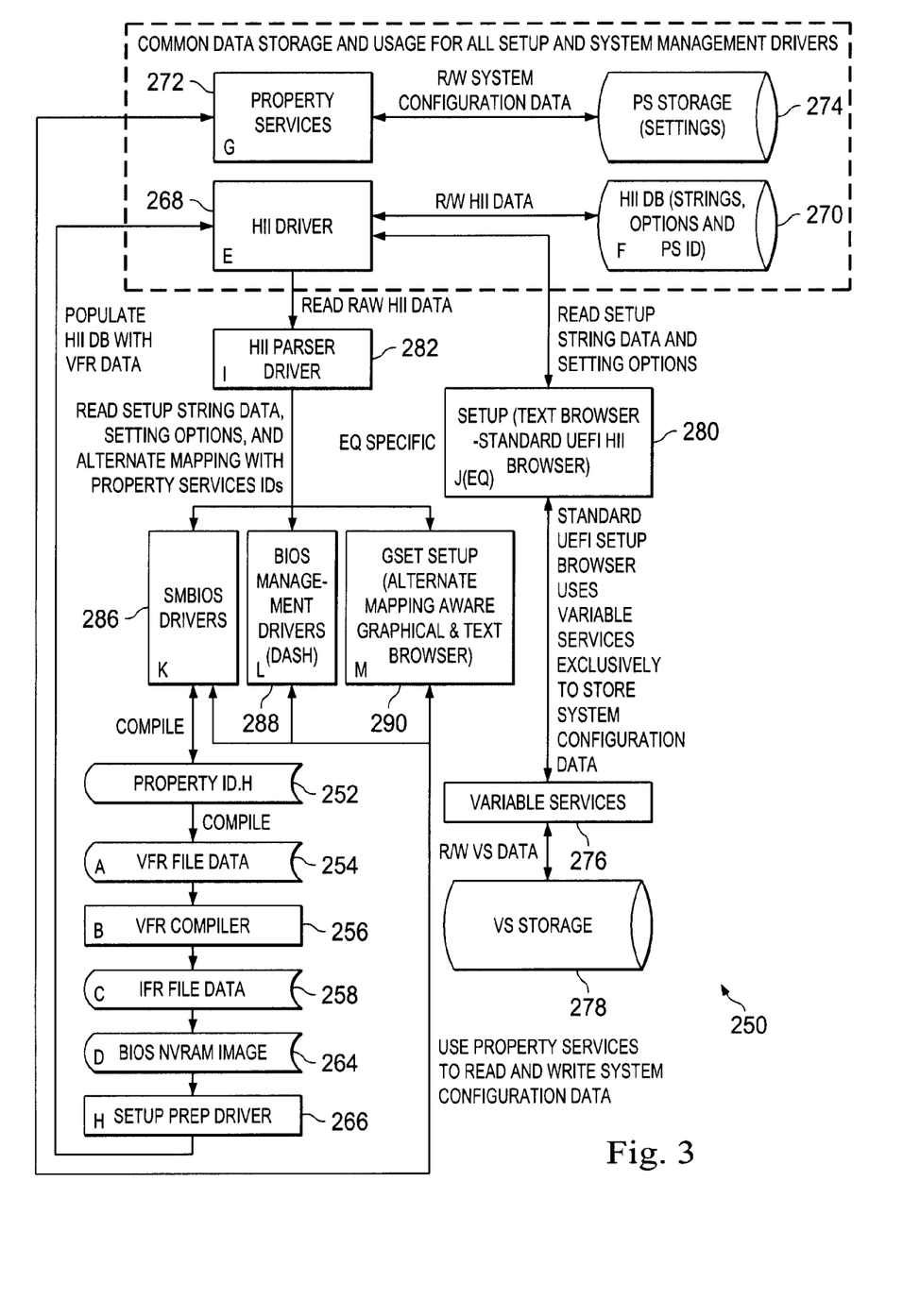
FIG. 3 illustrates a block diagram of an embodiment of VFR data flow with data mapping to an Human Interface Infrastructure (HII) database and UEFI drivers.

FIGS. 2A and 2B illustrate block diagrams showing an embodiment of a BIOS field mapping using an IHS 100. FIG. 2A illustrates a BIOS build flow 150. FIG. 2B illustrates a BIOS boot (execution) flow 151. FIG. 3 relates to FIGS. 2A and 2B and illustrates a block diagram of an embodiment of VFR data flow 250 including data mapping to a HII database (e.g., HII database 270) and UEFI drivers (e.g., SMBIOS Drivers 286, BIOS Mgmt Drivers (DASH) 288 and GSet Setup 290). As should be understood by a person having ordinary skill in the art, the embodiments shown in FIGS. 2A, 2B and 3 relate to one another, as described with the accompanying text. Therefore, FIGS. 2A, 2B and 3 will be described together for simplicity and clarity.

The BIOS build flow 150 begins at 152 where a PropertyID.h file 252 executing on an IHS 100 generates VFR text files 154, 254 to define setup screens and data items for start-up of the IHS 100. In an embodiment, the PropertyID.h file 252 defines all of the property IDs that are currently defined in the IHS 100. These IDs may be used to communicate to Property Services 272 to be able to read and write specific data that has or is being saved using Property Services 272. PropertyIDs allow for mapping of data using Property Services 272 that, in turn, allows for using a data storage device other than Variable Services 276 in a UEFI BIOS setting. The VFR File Data files 154, 254 represent the text based VFR data files that are edited and created to define BIOS setup screens and contents of these setup screens. This may include the titles, sub-titles, strings, fields and Variable Services 276 VarStore definitions as defined in the VFR/HII and UEFI specs. These VFR files 154, 254 may also define data mapping for a data storage device other than VS storage 278 of Variable Services 276. As such, the VFR files 154, 254 may be used to provide specific data defining attributes that are used for storing the data using Property Services 272 instead of Variable Services 276.

After generating the text files 154, 254 the flow 150 proceeds to block 156 where the VFR compiler 256 generates IFR (binary) data files 158, 258 from the VFR data files 154, 254. In an embodiment, the VFR compiler 156, 256 may be a standard UEFI VFR compiler. However, it should be understood that custom compilers may be used for the VFR compiler 156, 256. In an embodiment, the IFR (binary) data files 158, 258 are similar to standard output files generated by the UEFI VFR compiler 156, 256. However, the data files 158, 258 also include relevant mapping data to the alternate storage device.

The flow 150 then proceeds from generating the IFR data files 158, 258 to block 160, where a UEFI BIOS build process creates a binary BIOS image 164, 264 of a UEFI BIOS to load into the system. In addition to the set-up information, the UEFI BIOS build process may also include other BIOS related code and data 162 into the BIOS image 164, 264. As should be understood, that in an embodiment, the BIOS image 164, 264 is a read-only memory (ROM) image that gets created when the UEFI BIOS is created and packaged so that it can be flashed/stored in block 166 using the Setup Prep Driver 266 into the non-volatile random access memory (NVRAM) part of the system, such as the HII database 270. The UEFI BIOS image 164, 264 may include the UEFI BIOS code and the IFR Data 158, 258 that was compiled by the VFR compiler 156, 256. The Setup Prep Driver 266 is a driver added to a UEFI BIOS that loads the IFR Data 158, 258 that was stored into the BIOS NVRAM Image 164, 264. In an embodiment, driver 266 will load the IFR Data from the ROM image and then load it into the HII Database 270 using protocols from the HII Driver 268 which then stores the data into the HII Database 270. The HII driver 268 may include standard UEFI HII protocols and drivers. However, it should be understood that a custom driver may be implemented in the present disclosure. Similarly, the HII database 270 may be a standard UEFI HII database. Here again, a custom database may be used with the present disclosure.

In operation, the BIOS build flow 150 of FIG. 2A now continues to block 168 of the BIOS boot (execution) flow 151 of FIG. 2B. In Block 168, the UEFI BIOS image from Block 166 is stored as BIOS image 130 on the IHS 100.

At block 170 of the BIOS boot flow 151, a user of the IHS 100 turns on the IHS 100, thus initiating the BIOS boot process 151. The flow 151 proceeds to block 172 where various UEFI drivers begin getting loaded and executed, satisfying dependency requirements for requesting drivers. From block 172, the flow follows to block 174 where the HII driver 268 loads, executes and installs its protocols. In block 174, HII database 270 is also initialized.

The BIOS boot flow 151 then proceeds to block 178 where the Property Services driver 272 loads, executes and installs its protocols. Property Services 272 may be used as an alternate storage mechanism for a UEFI BIOS. The Property Services protocols and drivers provide an alternate system for storing data in the UEFI BIOS, such as BIOS image 130. The Property Services Storage 274 may be any or all the different locations that the Property Services Drivers 272 can store and retrieve data. As such, it may include RAM, NVRAM, CMOS or any other storage medium that is available to the BIOS (e.g., BIOS image 130) to use.

The BIOS boot flow 151 then proceeds to block 180 where the Setup Prep Driver 266 loads and executes. In block 180 the Setup Prep Driver 266 also loads the IFR data stored in the UEFI BIOS image 130 in the NVRAM 128. This can be illustrated as the IFR data being loaded from UEFI BIOS image in NVRAM coming from block 168. This IFR data is also loaded into the HII database 270 using HII protocols.

The flow 151 next proceeds to block 182 where the HII Parser Driver 282 loads, executes and installs its protocols. In an embodiment, the HII Parser Driver 282 is a parser added to a UEFI BIOS to provide parsed HII data to the consumers of the setup information that were originally defined in the VFR Files 154, 254. It should be understood that the Parser Driver is not a requirement of the present disclosure, but is shown to illustrate an embodiment of implementing UEFI BIOS using the HII Data.

Next, the flow 151 proceeds to block 184 where the flow 151 determines if a standard UEFI browser (e.g., Setup Browser 280) is used, and if so, allows it to be loaded and use the HII data directly. Block 184 is used to represent a generic equivalent of the specific browser provided as the Setup Browser 280. In an embodiment, the Setup Browser 280 represents an industry standard UEFI Text Setup Browser. In an embodiment, the present disclosure may use AMI® APTIO® Text Mode Browser. However, other browsers may be used. Variable Services 276 and VS Storage 278 are shown in FIG. 3 to illustrate that embodiments of the present disclosure may be used with traditional UEFI BIOS systems to store and retrieve BIOS setup data. Variable Services 276 are standard UEFI Variable Services protocols and drivers, as are readily understood in the art. Similarly, VS Storage 278 is a standard UEFI Variable Services storage medium, as is readily understood in the art. Using Variable Services 276 and VS Storage 278, a standard UEFI setup browser uses Variable Services exclusively to store system configuration data. To the contrary, the present disclosure provides alternate field mapping for the setup data.

From block 184, the BIOS Boot Flow 151 may proceed to any or all of blocks 186, 188, or 190 to reach clients of the setup data (e.g., SMBIOS Drivers 286, BIOS Mgmt Drivers (DASH) 288, and GSet Setup 290). Other clients may access the data mapped with the present disclosure.

Block 186 provides that SMBIOS Drivers 286 load, execute and install their protocols. In an embodiment, UEFI drivers may use the alternate mapping data to access Property Services 272 instead of Variable Services 276. SMBIOS Drivers 286 may be IHS manufacturer specific UEFI SMBIOS drivers that consume the HII Data that includes the alternate data mapping information to provide for the use of Property Services 272 instead of Variable Services 276. In an embodiment, an SMBIOS driver 286 does not read or write data from Variable services 276.

Block 188 provides that BIOS Mgmt Drivers 288 load, execute and install their protocols. In an embodiment, UEFI drivers may use the alternate mapping data to access Property Services 272 instead of Variable Services 276. BIOS Mgmt Drivers 288 may be IHS manufacturer specific UEFI BIOS Management (DASH) drivers that consume the HII Data that includes the alternate data mapping information to provide for the use of Property Services 272 instead of Variable Services 276. In an embodiment, a BIOS Mgmt driver 288 does not read or write data from Variable Services 276.

Block 190 provides that GSet Graphical and Text Setup Browser Drivers 290 (e.g., alternate mapping aware graphical & text browser) load, execute and install their protocols. In an embodiment, UEFI drivers may use the alternate mapping data to access Property Services 272 instead of Variable Services 276. GSet Graphical and Text Setup Browser Drivers 290 may be IHS manufacturer specific UEFI Graphical Setup drivers that consume the HII Data that includes the alternate data mapping information to provide for the use of Property Services 272 instead of Variable Services 276. In an embodiment, a GSet Graphical and Text Setup Browser Driver 290 does not read or write data from Variable Services 276.

As discussed above, the present disclosure provides for mapping the setup data contained in the HII database to Property Services 272 or to other data store service drivers that may be available in the future, such as the Intel® proposed PCD® data store protocols. This would allow the UEFI drivers that need access to the HII database 270 to get setup strings and prompts along with a mapping of system configuration data through Property Services 272. Therefore, it should be understood by those having ordinary skill in the art that this would also allow standard UEFI setup browsers to work without modification.

In an embodiment, the VFR language is used to describe BIOS Setup screens in a UEFI environment. A VFR compiler 256 then compiles VFR source 254 into binary data (e.g., IFR data 258). These IFR files 258 are registered into the HII database 270 at runtime. It is then possible for applications such as a SMBIOS 286, a DASH 288 or a Setup Browser 290 to parse this database to view/modify all user-changeable fields.

As is known in the art, the VFR language traditionally only allows the specifying of UEFI Variable Services (e.g., 276) as a data store to access setup data. As such, IHS manufacturers have developed systems to store BIOS data using Property Services 272. A problem with the traditional system is that Property Services 272 was not usable as a data storage system in a setup field definition using VFR. To accommodate backward compatibility with existing systems, it is impractical to change the existing VFR compilers or extend the VFR language because that would make the solution non-standard where standard UEFI setup browsers would no longer work. Thus, it is desirable to add Property Services 272 data to the HII database 270 using the VFR programming language as it is currently defined. Therefore, the present disclosure provides a description of adding this data mapping. It is contemplated that this disclosure applies to existing BIOS data storage systems as well as future alternative BIOS data storage systems that may be different from traditional Variable Services 276. Accordingly, it should be understood those having ordinary skill in the art that embodiments of the present disclosure are more secure than traditional setup data storing systems.

The present disclosure contemplates that there are multiple ways to implement systems for storing the BIOS setup data. It should be readily understood that there is multiple ways that the data mapping information can be defined, using the standard VFR programming language, compiled with the standard VFR compiler 256, and ultimately stored in the HII database 270 for these drivers to access. Having the BIOS setup information stored together in the HII Database 270 allows different consumers of the Setup data to be able to identify where specific BIOS setup data is stored and how to access it, while at the same time providing backward compatibility to current setup browsers.

Figure 4:
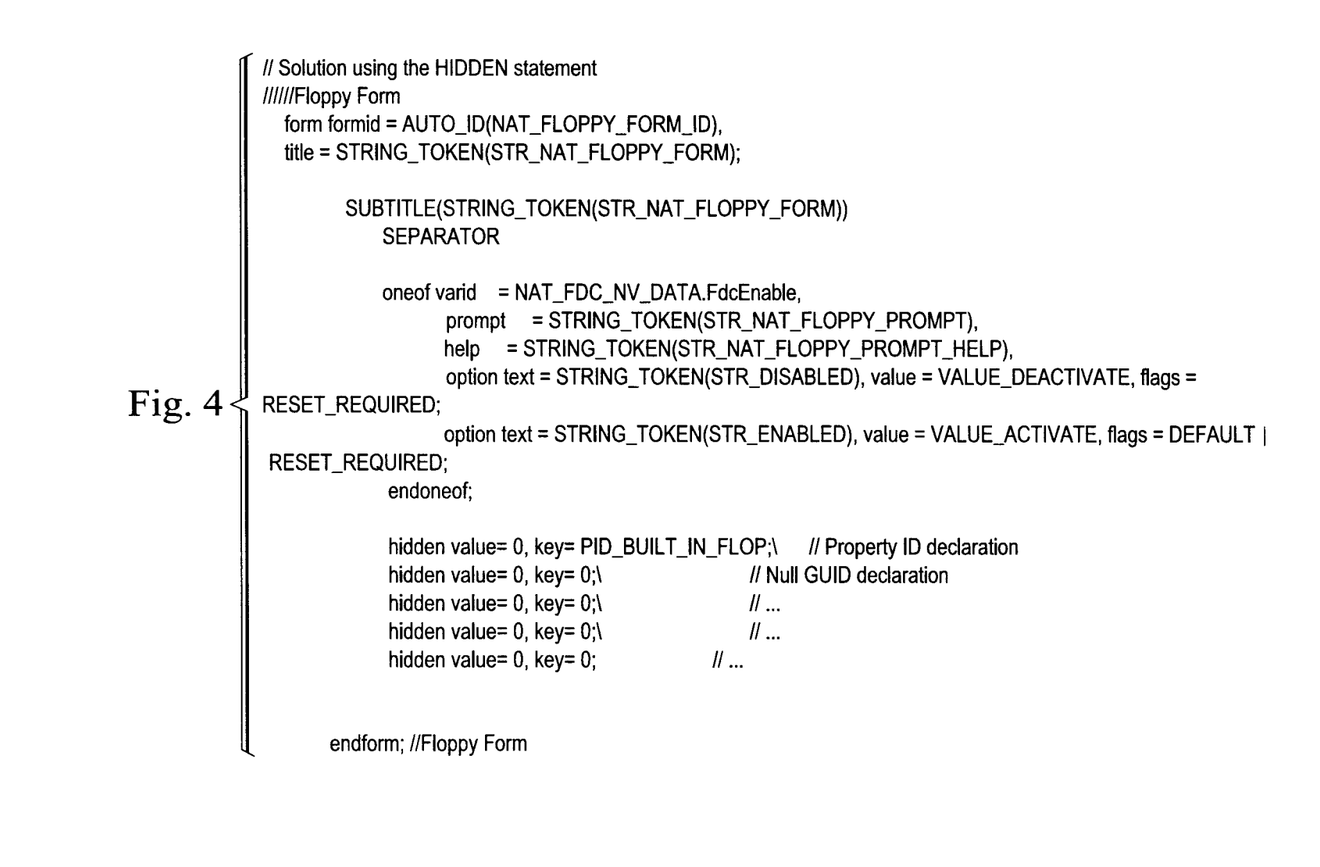
FIGS. 4-6 illustrate different embodiments of VFR source code for implementing the process and data flow illustrated in FIGS. 1-3.
Figure 5:
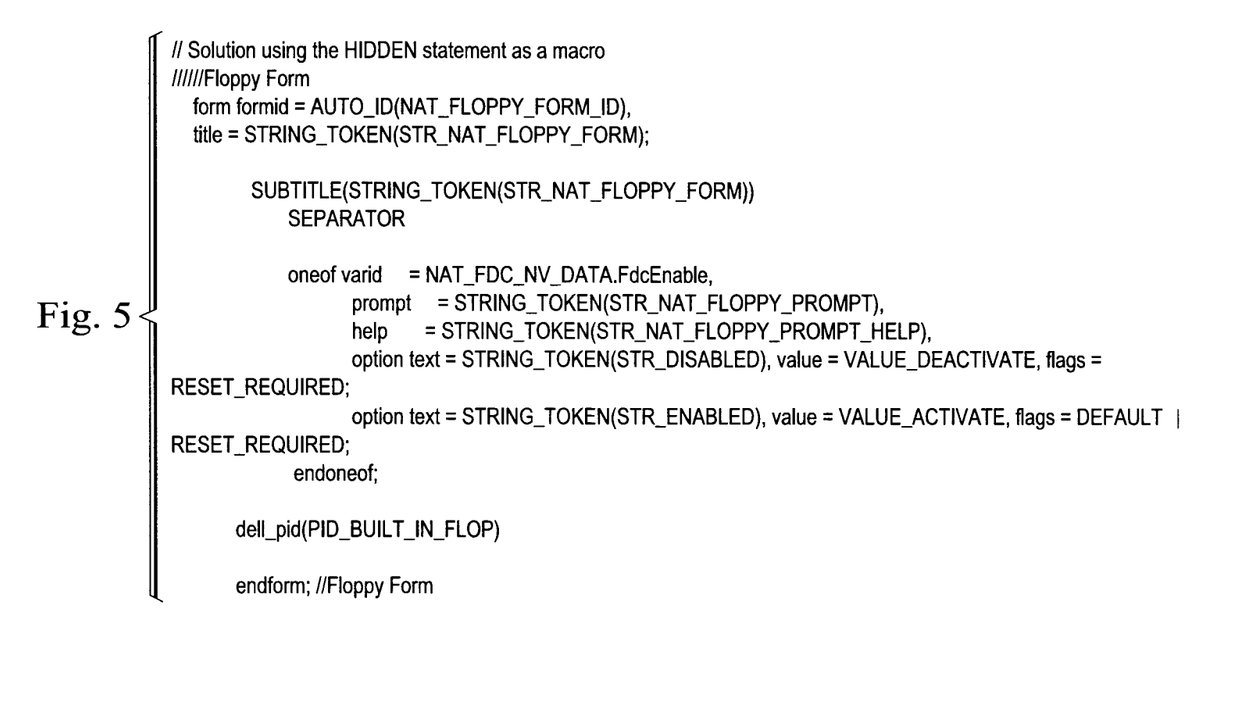
Figure 6:
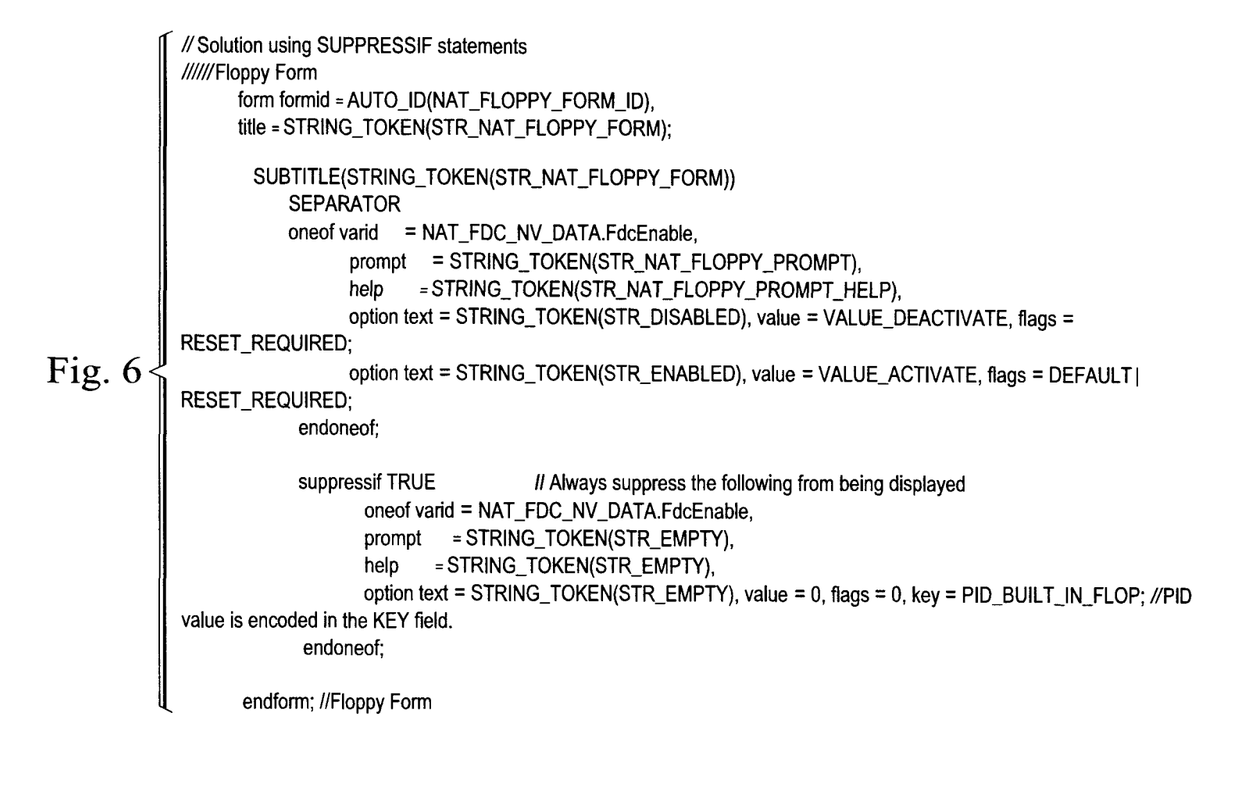

In an embodiment, the present disclosure creates data mapping between setup fields, configuration structures and fields and property IDs using the VFR programming language. In an embodiment, the present disclosure provides that mapping data is being encoded in the VFR source code in such a way that standard IFR browsers should not display this information. Conversely, in an embodiment, only an IHS manufacturer's specific IFR-PID driver is able to interpret this additional encoded information. In an embodiment, property ID (or other data store system) information is concealed using the standard VFR commands "SUPPRESSIF" and/or "HIDDEN". Embodiments of this can be seen in FIGS. 4-6. Specifically, options for defining this data using the VFR programming language are shown in FIGS. 4-6. The present disclosure provides for using the VFR programming language to define data relationships that are not supported directly by the VFR programming language.

The present disclosure also provides for interaction between several different UEFI drivers in an IHS client UEFI BIOS, including a standard HII Setup Browser (e.g., 280). Accordingly, an embodiment of the present disclosure provides that the VFR files are using PropertyID.h 252 as the source of data mapping that is compiled into IFR and then loaded into the HII database 270 at runtime. An embodiment also shows that BIOS setup data may be stored in the HII database 270 and that a runtime mapping of Property Service 272 data to setup fields may be provided. The disclosure also provides a runtime mapping between Property Services 272 data and a standard VFR mapping to Variable Services 276 structure and field. Accordingly, both of these mappings may be used at runtime by different UEFI drivers. Thus, this allows a single data store (e.g., Property Services 272) to be used while supporting data mapping and access from BIOS/setup drivers. Furthermore, embodiments of the present disclosure support standard HII setup browsers (e.g., 280) with no changes or deviation from the HII specification.

FIGS. 4-6 illustrate different embodiments of VFR source code for implementing the process and data flow illustrated in FIGS. 1-3. FIG. 4 provides an embodiment of data mapping using a VFR "hidden" statement, FIG. 5 provides an embodiment of data mapping using a VFR "hidden" statement as a macro and FIG. 6 provides an embodiment of data mapping using a VFR "suppressif" statement. These are exemplary embodiments and other embodiments are contemplated within the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS), comprising:
   a processor;
   at least one storage device coupled to the processor; and
   a non-transitory, computer-readable medium coupled to the processor and including instructions that, when executed by the processor, cause the processor to:
   receive text format IHS setup data and text format mapping data;
   convert the text format IHS setup data and text format mapping data to binary format IHS setup data and binary format mapping data;
   store the binary IHS setup data and the binary format mapping data in a database in the at least one storage device;
   retrieve, by a browser, a portion of the binary format IHS setup data from the database and store, by the browser, information in the at least one storage device using a primary data storage mechanism; and
   retrieve, by a driver, the binary format mapping data from the database, and use the binary format mapping data to retrieve information in the at least one storage device using an alternative data storage mechanism that is different from the primary data storage mechanism.

2. The IHS of claim 1, wherein the database is a Human Interface Infrastructure (HII) database.

3. The IHS of claim 1, wherein information retrieved by the driver in the at least one storage device using the alternative data storage mechanism includes settings information.

4. The IHS of claim 1, wherein the primary data storage mechanism is a Unified Extensible Firmware Interface (UEFI) Variable Services data storage mechanism.

5. The IHS of claim 1, wherein the alternative data storage mechanism is a Unified Extensible Firmware Interface (UEFI) Property Services data storage mechanism.

6. The IHS of claim 1, wherein the information that is stored by the browser using the primary data storage mechanism is stored on a first storage device of the at least one storage device and the information that is retrieved by the driver using the alternative data storage mechanism is retrieved from a second storage device of the at least one storage device, and wherein the first storage device is different from the second storage device.

7. The IHS of claim 1, wherein the non-transitory, computer-readable medium includes instructions that, when executed by the processor, cause the processor to:
provide an operating system, wherein information that is stored in the at least one storage device using the alternative data storage mechanism is hidden from the operating system.

8. The IHS of claim 1, wherein information retrieved by the driver in the at least one storage device using the alternative data storage mechanism includes settings information.

9. An information handling system (IHS), comprising:
a processor;
at least one storage device coupled to the processor; and
a non-transitory, computer-readable medium coupled to the processor and including instructions that, when executed by the processor, cause the processor to:
receive IHS setup data and mapping data;
store the IHS setup data and mapping data in a database in the at least one storage device;
retrieve, using a setup browser, a portion of the IHS setup data from the database and store, by the setup browser, information in the at least one storage device using a primary data storage mechanism; and
retrieve, by a driver, the mapping data from the database, and use the mapping data to retrieve information data in the at least one storage device using an alternative data storage mechanism that is different from the primary data storage mechanism.

10. The IHS of claim 9, wherein the database is a Human Interface Infrastructure (HII) database.

11. The IHS of claim 9, wherein the primary data storage mechanism is a Unified Extensible Firmware Interface (UEFI) Variable Services data storage mechanism.

12. The IHS of claim 9, wherein the alternative data storage mechanism is a Unified Extensible Firmware Interface (UEFI) Property Services data storage mechanism.

13. The IHS of claim 9, wherein the information that is stored by the setup browser using the primary data storage mechanism is stored on a first storage device of the at least one storage device and the information that is retrieved by the driver using the alternative data storage mechanism is retrieved from a second storage device of the at least one storage device, and wherein the first storage device is different from the second storage device.

14. The IHS of claim 9, wherein the non-transitory, computer-readable medium includes instructions that, when executed by the processor, cause the processor to:
provide an operating system, wherein the information that is stored in the at least one storage device using the alternative data storage mechanism is hidden from the operating system.

15. A method comprising:
receiving text format IHS setup data and text format mapping data;
converting the text format IHS setup data to binary format IHS setup data and the text format mapping data to binary format mapping data;
storing the binary format IHS setup data and the binary format mapping data in a database of at least one non-volatile storage device;
retrieving, by a browser, a portion of the binary format IHS setup data from the database and storing, by the browser, information in the at least one non-volatile storage device using a primary data storage mechanism; and
retrieving, by a driver, the binary format mapping data and using, by the driver, the binary format mapping data to retrieve information in the at least one non-volatile storage device using an alternative data storage mechanism that is different from the primary data storage mechanism.

16. The method of claim 15, wherein the database is a Human Interface Infrastructure (HII) database.

17. The method of claim 15, wherein the primary data storage mechanism is a Unified Extensible Firmware Interface (UEFI) Variable Services data storage mechanism.

18. The method of claim 15, wherein the alternative data storage mechanism is a Unified Extensible Firmware Interface (UEFI) Property Services data storage mechanism.

19. The method of claim 15, wherein the information that is stored by the browser using the primary data storage mechanism is stored on a first non-volatile storage device of the at least one non-volatile storage device and the information that is retrieved by the driver using the alternative data storage mechanism is retrieved from a second non-volatile storage device of the at least one non-volatile storage device, and wherein the first non-volatile storage device is different from the second non-volatile storage device.

20. The method of claim 15, further comprising:
providing an operating system, wherein information that is stored in the at least one non-volatile storage device using the alternative data storage mechanism is hidden from the operating system.

* * * * *